Sept. 4, 1956
A. A. MUEHLING ET AL
2,761,585
APPARATUS FOR ORIENTING PRISMATIC BODIES
Filed Jan. 10, 1951
6 Sheets-Sheet 1
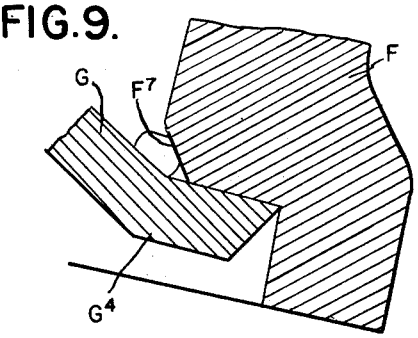
FIG.9.
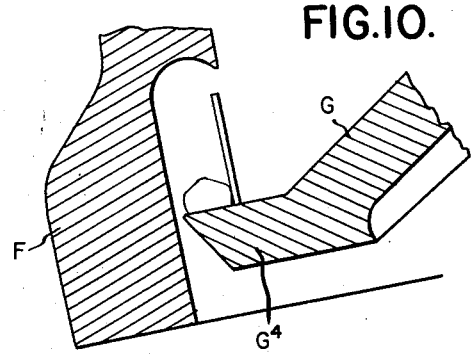
FIG.10.
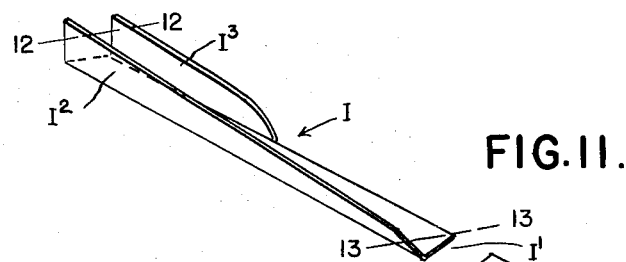
FIG.11.
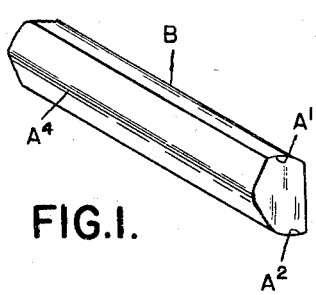
FIG.3.
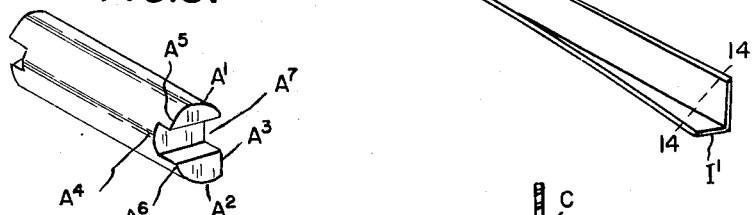
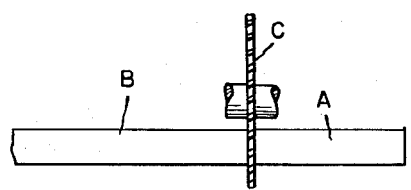
FIG.2.
FIG.1.
INVENTORS
ANTHONY A. MUEHLING
IVOR J. GRUENBERG
REINO H. MUSTONEN
BY
ATTORNEYS

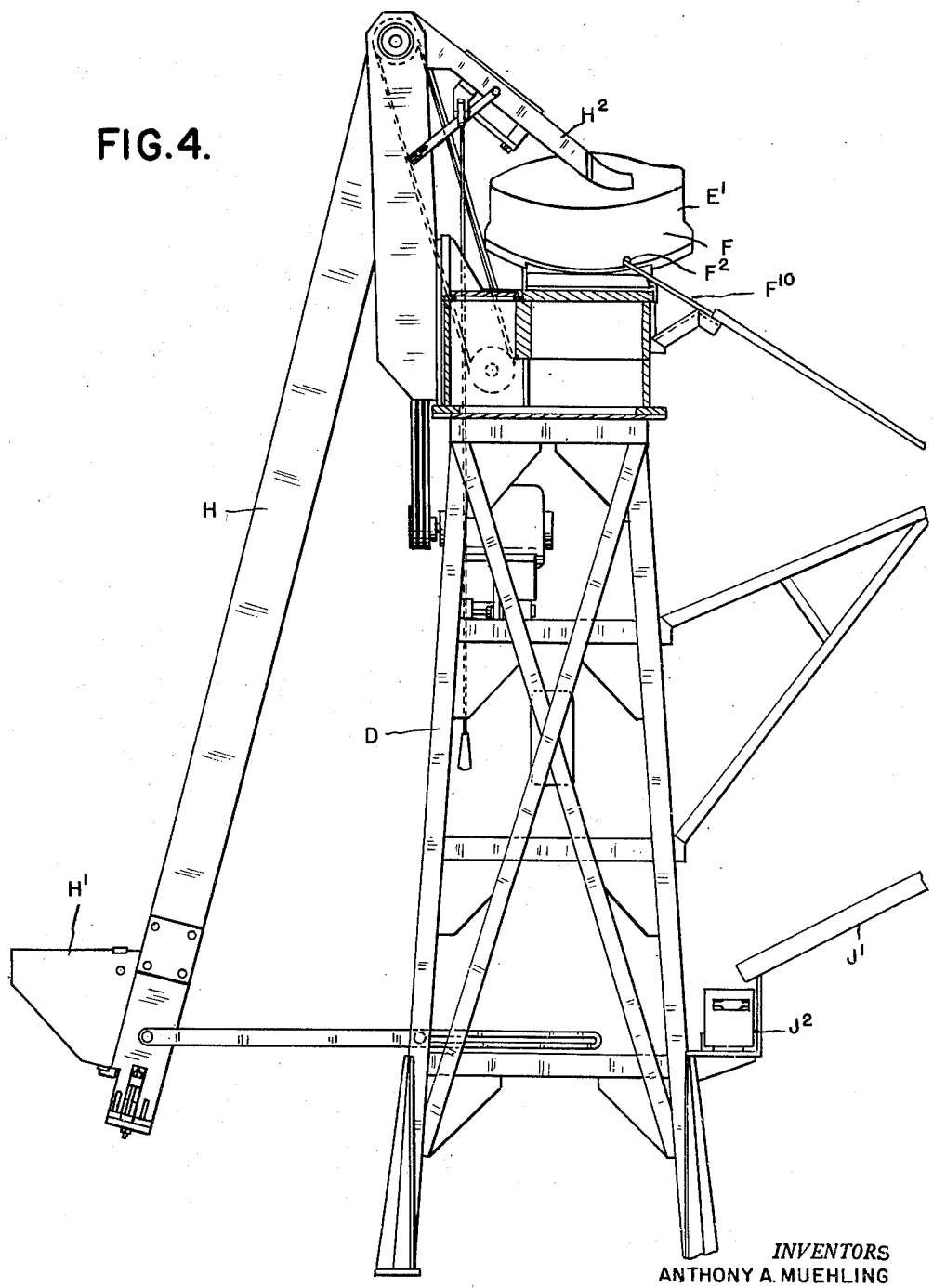

INVENTORS
ANTHONY A. MUEHLING
BY IVOR J. GRUENBERG
REINO H. MUSTONEN

ATTORNEYS

Sept. 4, 1956  A. A. MUEHLING ET AL  2,761,585
APPARATUS FOR ORIENTING PRISMATIC BODIES
Filed Jan. 10, 1951.  6 Sheets-Sheet 6

FIG.12.ª 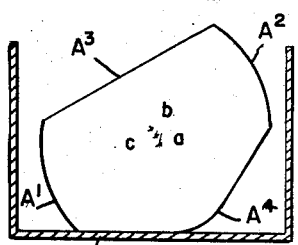
FIG.12.ᵇ 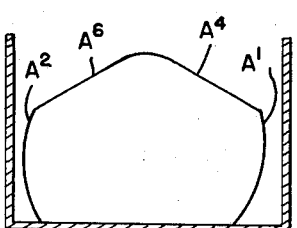

FIG.13.ª 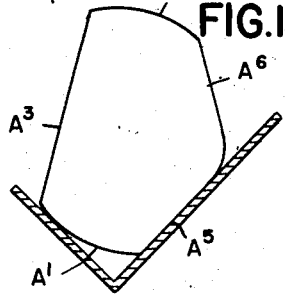
FIG.13.ᵇ 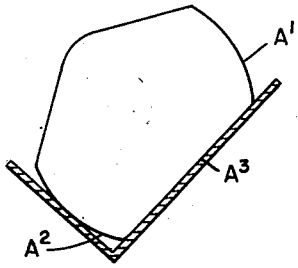

FIG.14.ª 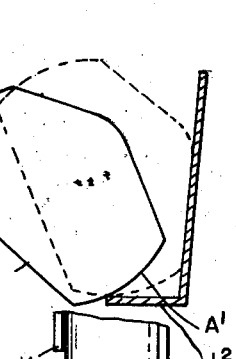
FIG.14.ᵇ 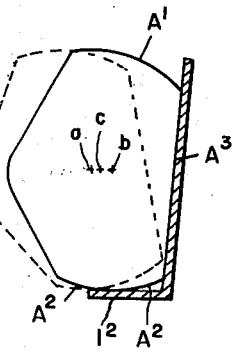
FIG.15.

INVENTORS
ANTHONY A. MUEHLING
BY IVOR J. GRUENBERG
REINO H. MUSTONEN
ATTORNEYS

United States Patent Office 2,761,585
Patented Sept. 4, 1956

2,761,585

APPARATUS FOR ORIENTING PRISMATIC BODIES

Anthony A. Muehling, Detroit, Ivor J. Gruenberg, Clarkston, and Reino H. Mustonen, Milford, Mich., assignors to The Gear Grinding Machine Company, Hamtramck, Mich., a corporation of Michigan Application January 10, 1951, Serial No. 205,342

5 Claims. (Cl. 221—174)

The invention relates to means for orienting prismatic bodies such, for instance, as sprags used in the manufacture of friction clutches.

It is the object of the invention to obtain means operable upon a mass of indiscriminately arranged prismatic bodies which will rapidly arrange the same series and with each member properly oriented in relation to the others.

To this end the invention consists in the method and apparatus as hereinafter set forth.

While the invention may be used for orienting prismatic bodies designed for various uses, we will herein specifically describe and illustrate only its application to the orienting of prismatic sprags.

In the drawings:

Fig. 1 is a perspective view of a stock rod from which the sprags are formed;

Fig. 2 is a plan view illustrating the means for severing sprags from the stock rod;

Fig. 3 is a perspective view of the severed sprag but showing the same with end notches formed by a subsequent operation;

Fig. 4 is a side elevation of the tower and elevator for the sprags showing one of the centrifugal distributors supported on said tower;

Figure 5:
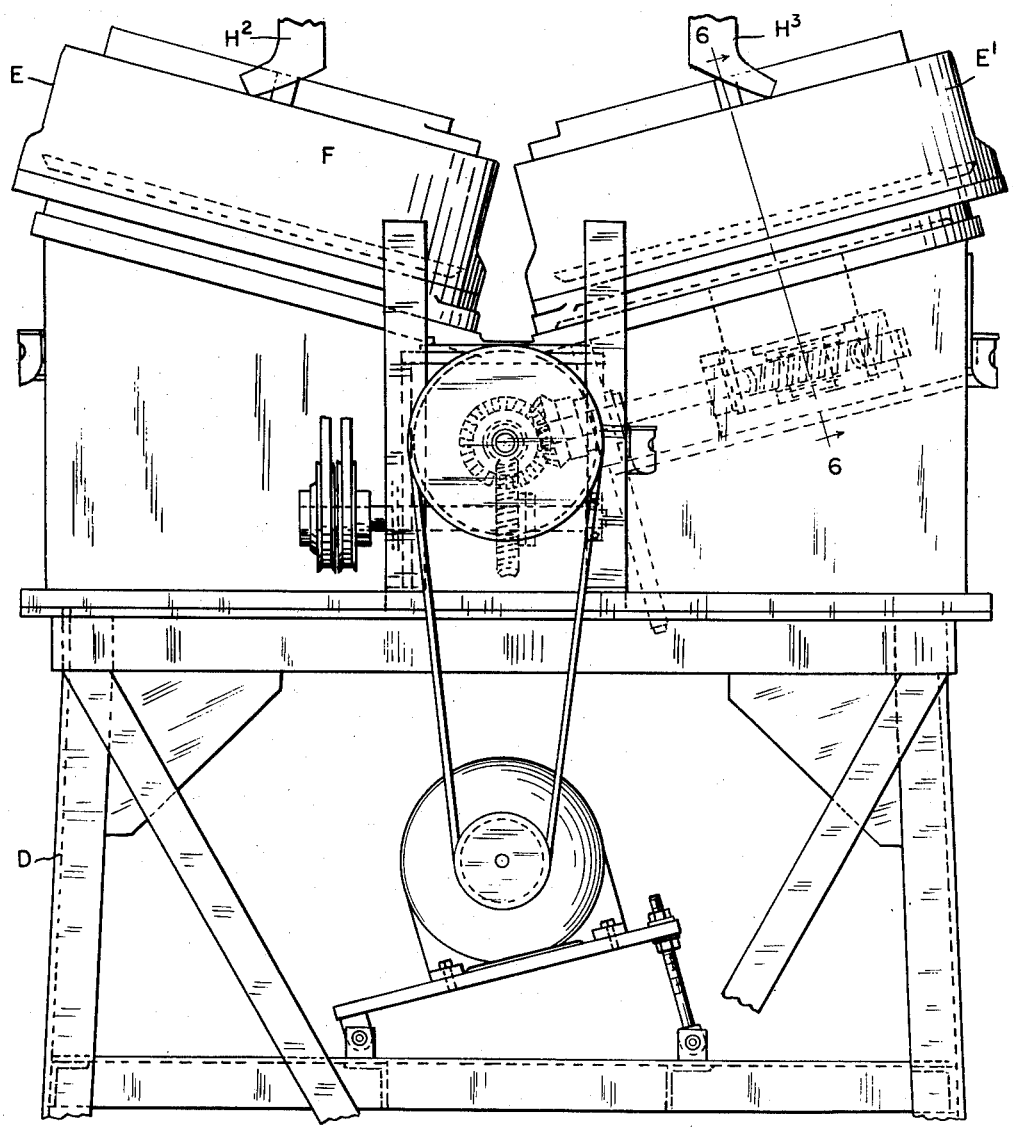
Fig. 5 is an end elevation of the construction shown in Fig. 4.
Figure 6:
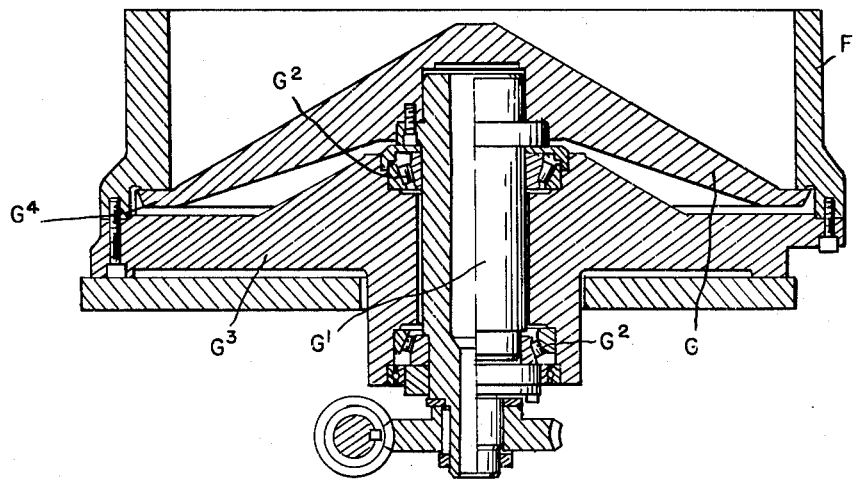
Fig. 6 is a cross section through one of the centrifugal distributors; on line 6—6, Fig. 5.
Figure 7:
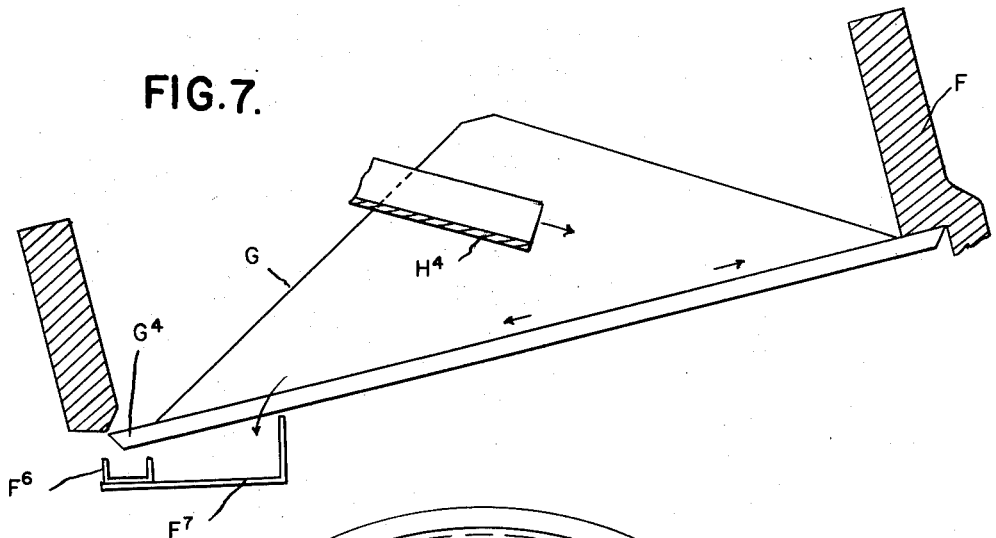
Fig. 7 is a cross section through the distributor substantially on line 7—7, Fig. 8.
Figure 8:
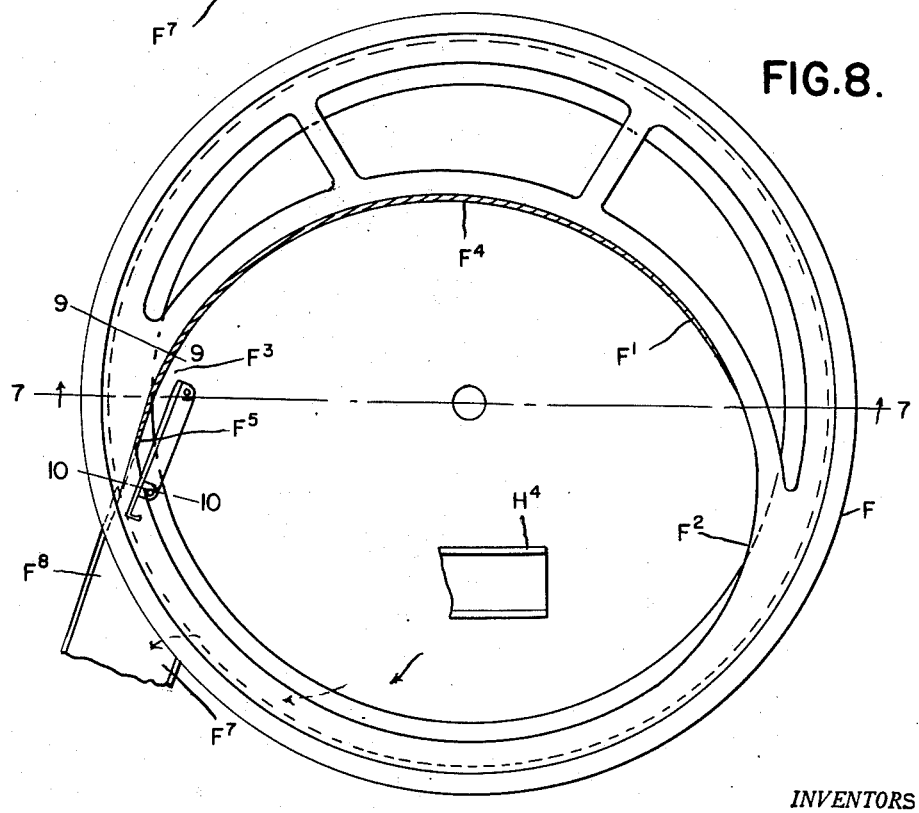
Fig. 8 is a plan view of the construction shown in Fig. 7.
Figure 12:
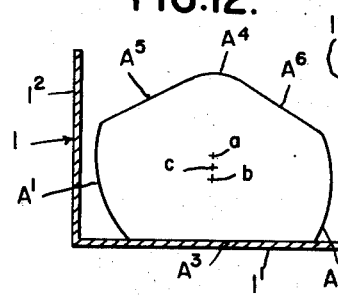
Figure 13:
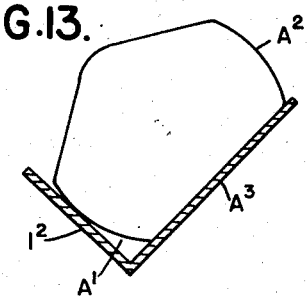
Figure 14:
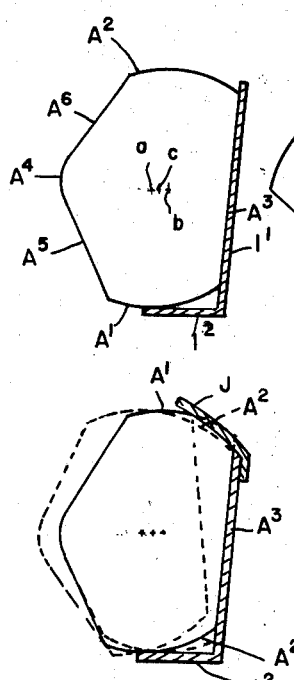

Figs. 9 and 10 are cross sections, respectively on lines 9—9 and 10—10, Fig. 8;

Fig. 11 is a perspective view of the inclined and twisted guideway along which the aligned sprags are advanced;

Figs. 12, 13 and 14 are cross sections, respectively, on lines 12—12, 13—13 and 14—14, Fig. 11, illustrating the turning of the sprags during advancement by the twisting of the guideway I;

Figs. 12$^a$ and 12$^b$ show sprags which are differently arranged in the guideway I from the sprags in Fig. 12 in the same plane of cross section;

Figs. 13$^a$, 13$^b$ and 14$^a$, 14$^b$ show the sprags, respectively, as arranged in 12$^a$ and 12$^b$ and in the planes of cross sections 13—13 and 14—14.

Figure 16:
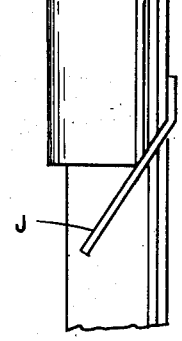

Fig. 15 is a view similar to Fig. 14$^b$ showing the safety means for removing from the series any improperly oriented sprags not previously removed;

Fig. 16 is a plan view of the construction shown in Fig. 15.

*Sprag construction*

As illustrated the sprag consists of a prismatic bar A of constant cross-section, the contour of which is non-symmetrical. More specifically this contour has diametrically opposite cam portions A′, A² preferably formed by eccentric arcs concentric with points, respectively, on opposite sides of the transverse center of gravity of the bar. Intermediate these cam portions there is on one side a straight wide face A³ and on the opposite side a V-shaped projecting portion with its apex A⁴ at the center and slightly rounded and with the portions A⁵ and A⁶ on opposite sides of said apex extending at opposite equal acute angles to said straight side and of lesser width. The opposite ends of the prism have notches A⁷ to receive energizing springs when used in a one-way clutch, and these notches are inclined both with respect to the straight side and the longitudinal axis of the prism. The structure is such that an annular series of sprags can be placed between concentric cylindrical race members of the clutch to occupy substantially the entire space therebetween, the nose of one sprag being adjacent to the straight side of an adjacent sprag. The cam portions will be adjacent respectively to the inner and outer race members and the energizing springs when engaged with the end notches will turn the sprags into frictional engagement with the race members.

Various methods may be employed for manufacturing the above sprag and which form no part of the instant invention. It is, however, always necessary to orient the sprags in relation to each other one or more times during the manufacturing process and to finally form oriented groups for assembly with the cooperating clutch members. In one method of manufacture bars B of steel or other suitable material are drawn through dies which impart the desired cross sectional contour and these bars are then cut into sprag lengths by suitable means such as a grinder wheel C, which severs without distortion of the form. After heat treatment the blanks are oriented in series for feeding to the notching machine (not shown) and subsequently must be reoriented for packaging or for assembly with the cooperating clutch members.

*Centrifugal distributor*

D is a tower having mounted on top thereof one or more centrifugal distributors and as illustrated a pair of such distributors E and E′ are arranged adjacent to each other in transverse alignment. Each of these distributors has a stationary outer casing F and a rotary conical bottom member G. The member G is mounted upon a shaft G′, which in turn is mounted by means of roller bearings G² in a stationary frame G³ supported on top of the tower. The axes of the shafts G′ are not however vertical but are inclined at an angle thereto preferably about 15 degrees and reversely in their common transverse plane. Each conical member G has a marginal flange G⁴ which extends radially outward in a plane perpendicular to its axis at the base of the cone. The casings F and cones G are therefore similarly tilted with their low sides adjacent to each other. Within each of the casings F is an eccentric wall portion F′ extending downward adjacent to the surface of the cone G and also extending from a point F² at the high side of the casing to a point F³ on the low side thereof. Between these points the radial distance of said wall from the axis of the cone varies, being shortest at the central point F⁴. On account of the inclination of the axes of the shaft G′, the surface of each cone at each point in its rotation changes its angular relations to a horizontal plane. Assuming that the cone angle is 60° to the axis or 30° to the plane of rotation, it is obvious that at the lowest point of the cone in the common axial plane of the shaft G′ the cone surface will be at an angle of 45° to the horizontal, while at the high side, or after a rotation of 180° the cone surface will be at an angle of 15° to the horizontal. Between these two points on each side, the angle to the horizontal changes one degree for each six degrees of rotation. Extending from the point F³ there is a tangential outlet channel $F^5$ which extends over the flange $G^4$ into a downwardly inclined guide channel $F^6$. The wall $F'$ is undercut at $F^7$ adjacent to the surface of the cone so that the angle of this undercut portion to the angle of the surface of the cone is substantially equal to the angle between the surface $A^3$ of the sprag and each of the surfaces $A^5$ and $A^6$ thereof.

Cooperating with the construction just described is an elevator H which raises the sprags from a hopper $H'$ to the top of the tower where they are discharged through branch spouts $H^2$ and $H^3$ to the respective distributors E and $E'$. The specific construction of the elevator is not illustrated but may be of endless belt type having cross cleats which lift groups of sprags from the hopper $H'$ and successively discharges the same into the spouts $H^2$ and $H^3$. The angle of the discharge end portion of each spout is such that the groups will be discharged with momentum in the direction of rotation of and over the bottom G slightly in rear of the point $F^2$. Centrifugal force due to frictional engagement of the sprags with the surface of the cone will throw them outward towards the wall $F'$ but, as the speed of rotation of the conical surface is proportional to the distance from its axis, the outermost sprags will travel faster than those further up on the cone thereby tending to arrange the same in aligned series. Any bunching or interference between sprags which checks the velocity of advancement of one or more in the direction of rotation will leave such checked members supported on an incline which slopes downward opposite to the direction of rotation. Consequently, these sprags will slide down over the surface of the cone and flange $G^4$ towards the low side thereof where they will pass through an aperture in the retaining wall into the channel member $F^5$ and returned thereby to the hopper $H'$.

The sprag when supported upon its face $A^3$ has its center of gravity at a lower point than when resting upon any of the other surface portions of the cross sectional contour. As there will be more or less rolling movement imparted to the sprags when traveling over the surface of the cone, this by the law of averages will cause the greater portion of the sprags discharged into the distributors E and $E'$ to be thus arranged when discharged through the tangential channel $F^5$. There is, however, nothing in the action of the centrifugal distributor to determine which end of the sprag will be in advance when discharged into the channel $F^5$. Furthermore, some of the sprags may rest on the faces $A^5$ or $A^6$ when they enter said channel. Thus there are several different possible orientations of the sprags in the discharged series.

Sorting means

The second step in the orientation of the sprags is accomplished by advancing the series over a guideway support on which only the properly oriented sprags are stable, all of the others being in unstable equilibrium so as to fall off of said support. For this purpose the discharge channel $F^6$ is connected with a downwardly inclined guideway I, which at its upper end is channel shaped having a bottom portion $I'$ and side flanges $I^2$ and $I^3$ as shown in Figs. 12, 12a and 12b. Lower down the guideway in the plane 13—13, the side $I^2$ is turned downward and the bottom $I'$ upward through an angle of substantially 45°. Still further down in the plane of cross section 14—14, the side $I^2$ is substantially horizontal while the former bottom portion $I'$ is nearly but not quite vertical. The side $I^2$ is also diminished in width as shown in Figs. 14, 14a and 14b. The sprag A as previously described has its cam portions $A'$ and $A^2$ formed as circular arcs with the respective centers thereof $a$ and $b$ laterally spaced from each other and on opposite sides of the center of gravity of the sprag $c$. It follows that if the flat face $A^3$ of the sprag is adjacent to the substantially vertical flange $I'$ and the cam face $A'$ is at the bottom resting on the flange $I^2$ (Fig. 14) the sprag will be in stable equilibrium as shown in Fig. 14. This is for the reason that the center of gravity $c$ of the sprag is inside of the center $a$ of the arc (between the center $a$ and side $I'$ of the guide), which center $a$ is vertically above the point of support in the arcuate surface $F'$. On the other hand if the cam face $A^2$ is at the bottom the side $A^3$ being still adjacent to the flange $I'$, the center of gravity $c$ is outside the center $b$ of the arc, so that the sprag will be in unstable equilibrium and will tip off from the flange $I'$ as shown in Fig. 14b. Where the sprag originally rests on one of the surfaces $A^5$ and $A^6$ as shown in Fig. 12a, when it reaches the portion of the guide shown in Fig. 14a the center of gravity $c$ will be outside the center $a$ or $b$ of the arc so that the sprag is unstable. Consequently, the sprags which originally are positioned within the conduit I, as shown in Figs. 12 and 12a, will in the positions 14 and 14a fall out from the series leaving in the series only the sprags originally in the position shown in 12b.

In order that the unstable sprags may fall without disturbing the stable ones, it is necessary that the successive sprags should be slightly spaced from each other and this is accomplished in the centrifugal distributor during travel along the eccentric wall $F'$. In the first part between the points $F^2$ and $F^4$ the velocity of advancement will be reduced due to movement upward on the cone to a point of smaller radius. However, between the point $F^4$ and the point $F^3$ which connects with the tangential discharge channel, the movement of the sprags will be accelerated separating each member in advance from the one immediately following. As a safety measure we provide additional means for eliminating the improperly oriented sprags which will operate even where the spacing between sprags has been lost for any reason. This safety means is formed by an obliquely arranged deflector member J adjacent to the guide, which will contact with a portion of the cam $A'$ when the latter is at the top but will not contact with the cam $A^2$ when at the top as shown in Fig. 15. At the point where this deflector is arranged there is nothing to interfere with such deflection of the improperly oriented sprag, but slightly in rear of this point the guideway has a vertical flange K to the left, Fig. 16, which holds the falling sprag from being deflected even if it should be in frictional contact with the rear end of the deflected sprag. This prevents the throwing out of any properly oriented sprag which might otherwise be deflected by the sprag in advance thereof.

Complete operation

From the above description it will be understood that the centrifugal distributor only functions to form a series in which the sprags have their longitudinal axes in alignment and that this series may include sprags indiscriminately positioned as shown in Figs. 12, 12a and 12b. Most sprags of the series will be either in the position as in Fig. 12 or in 12b, but some may be positioned as in Fig. 12a. Not all of the sprags discharged into the centrifugal distributor will be aligned against the retaining wall F, but those failing to reach this point will be on a portion of the conical surface nearer to the axis which is traveling at slower linear speed. Consequently, such sprags will slide rearward down the inclined surface of the cone and will be thrown out from the centrifugal distributor. Of the sprags which form the aligned series, those which are positioned as in Fig. 12 will be retained but those positioned as in Fig. 12a or 12b will be thrown out. Thus all of the sprags in the final series will have the same orientation therein.

What we claim as our invention is:

1. Apparatus for arranging like prismatic bodies in series with their longitudinal axes in alignment comprising a receptacle having a rotary bottom support in the form of a cone extending upward within said receptacle with its apex centrally thereof and its axis which is also the axis of rotation inclined to the vertical, a stationary retaining wall of said receptacle extending upward from said rotating support and provided with a tangential outlet located adjacent the low side of the cone and a chute for depositing indiscriminately arranged prismatic bodies on the ascending side of the cone with respect to its direction of rotation.

2. The construction as in claim 1 having a radially outwardly extending marginal flange at the base of the cone in the plane of rotation thereof.

3. The construction as in claim 1 in which the bodies are deposited within a selected area with respect to the changing angle of ascent of said rotary conical support being of such inclination that those of said bodies not aligning against said retaining wall will slide down the incline counter to the direction of rotation, said retaining wall being apertured for the discharge of said countermoving bodies.

4. The construction as in claim 3 provided with means for discharging said bodies with momentum in the direction of rotation above said selected area.

5. The construction as in claim 4 in which a portion of said retaining wall in rear of said tangential outlet is eccentric to the axis of the cone thereby progressively accelerating the velocity of the frictionally driven aligned bodies traveling adjacent to said wall to space said bodies from each other in the discharged series.

References Cited in the file of this patent

UNITED STATES PATENTS

| | | |
|---|---|---|
| 245,408 | Sheldon | Aug. 9, 1881 |
| 812,327 | Cranner | Feb. 13, 1906 |
| 1,053,634 | Magy | Feb. 18, 1913 |
| 1,195,054 | McLeod | Aug. 15, 1916 |
| 1,445,296 | Clark | Feb. 13, 1923 |
| 1,456,216 | Brightman | May 25, 1923 |
| 1,606,432 | Herkenhine | Nov. 9, 1926 |
| 1,823,995 | Streby | Sept. 22, 1931 |
| 1,989,924 | Hill | Feb. 5, 1935 |
| 2,385,951 | Stelzer | Oct. 2, 1945 |
| 2,431,559 | Humpreys | Nov. 25, 1947 |
| 2,561,413 | Auman | July 24, 1951 |